Nov. 26, 1935. N. B. HENRY 2,022,564
APPARATUS FOR REMOVING FIBER FROM SEED COTTON
Filed July 24, 1934 4 Sheets-Sheet 3

Inventor
NELSON B. HENRY

By Mason Fenwick Lawrence
Attorneys

Nov. 26, 1935.   N. B. HENRY   2,022,564
APPARATUS FOR REMOVING FIBER FROM SEED COTTON
Filed July 24, 1934   4 Sheets-Sheet 4

Inventor
NELSON B. HENRY

By Mason Fenwick & Lawrence
Attorneys

Patented Nov. 26, 1935

2,022,564

UNITED STATES PATENT OFFICE 2,022,564

APPARATUS FOR REMOVING FIBER FROM SEED COTTON

Nelson B. Henry, Columbus, Ga.

Application July 24, 1934, Serial No. 736,760

15 Claims. (Cl. 19—57)

This invention relates to apparatus for removing the fiber from seed cotton, such as cotton gins and delinters, and more specifically to cotton gins and the like of the saw type.

In apparatus heretofore used, the seed cotton is fed into a stationary roll box, the lower wall of which is formed of spaced ribs.

Between these ribs and into the roll box project the peripheries of the saws of a saw cylinder, consisting of a plurality of ginning saws aligned on a single shaft. These saws are so spaced from the ribs that the seeds cannot pass out of the roll box between the ribs and the saws, but the cotton can. The saws projecting into the roll box rotate the mass of cotton into a roll and at the same time rotate the roll.

The saw teeth also rotating through the roll take hold of the fibers of the seeds and pull the fibers, without the seeds, through the spaces between the saws and ribs.

As the fibers are carried out of the roll box by the saws, they are removed therefrom in various manners, such as by a brush contacting with the saw teeth, or by an air blast blowing the fibers off the teeth, or by drawing the fibers off by means of suction.

The fibers are then commonly carried to a condenser where they are collected and baled.

In the roll box thus described, there is always a tendency toward choking, that is, whenever some damp or dirty cotton is being ginned, there is a tendency for some of the fibers to collect between the ribs immediately above and surrounding the saw teeth. This clogging is slight at first, but increases rapidly until the spacing between the ribs and saws is choked solid with fiber.

The removal of this choked cotton usually necessitates the stopping and dismantling of the machine with the consequential loss of time. It often happens that the ribs are forced out of alignment and have to be reset by a skilled mechanic before the gin can again be put to work.

If the choking goes unnoticed for even a short length of time, the friction between the rapidly revolving saw and the fiber may generate sufficient heat to set the cotton on fire, thus resulting in the destruction of the gin and sometimes of the gin house.

Further, in the stationary roll boxes now in use, if the cotton roll becomes packed too tightly, the friction between the sides of the roll box and the cotton roll may stop the rotation of the roll, and the saw would then cut grooves in the roll and rotate in the grooves thus formed. In this case, the ginning has to stop until the entire roll is cleaned out.

Again, in the gins, delinters and the like as used at present, the wear on the ribs is concentrated on a small area close to the saw teeth. As a result, this small area is so worn after the machine has been in operation for some time that the seeds are no longer prevented from passing between the saws and the ribs. It is usually necessary to ship the machine back to the factory for repair, because, as has been explained before, the reassembling and spacing of the ribs necessitate the dismantling of the entire machine by highly skilled workmen.

Again, the cotton roll in the stationary roll box is merely rotated around its longitudinal axis. Each seed is therefore repeatedly ginned by the same saw. Should several saw teeth be missing, or the saw worn, the ginning would be incomplete and a quantity of fiber left on the seed. As the price of cotton fiber as compared with the cotton seed is very great, it will be seen that this condition is highly undesirable.

One object of my invention is to obviate these defects in machines now in use.

Another object is to provide an apparatus for removing fiber from seed cotton which will remove more fiber from each seed with less injury to the fiber and do it more economically and quickly than has been heretofore accomplished.

Another object is to ensure the continuous rotation of the cotton roll in the roll box, to provide for the complete discharge of the seed from the roll box during the ginning operation, positively to prevent choking in the rib spacings, to provide for the distribution of the wear over the entire rib, and to ensure the ginning of each seed by a plurality of saws.

Another object is to provide for dismantling the cotton gin and the like conveniently and with celerity, and the insertion therein with a minimum of effort of new saws or ribs, and for automatically and accurately spacing the saws and ribs.

Other objects of my invention will appear hereafter.

I attain the above and other ends primarily by means of a roll box which is rotated while the saws projecting therein are rotated, and preferably so that the peripheries of the roll box and saws move in the same direction, at the same or at an appropriately different rate of motion. The revolving roll box thus carries the contained cotton roll repeatedly past the several sets of peripheral saws in succession. Secondarily, by feeding the seed cotton into the end of and axially through the roll box, the cotton is subjected progressively to the action of the various axially aligned saws, as well as of the peripherally arranged sets of saws. Further, I by preference make the rotatable roll box of an axially aligned series of ring-like sections, which form the spaced ribs between which the fibers are drawn by the saws but between which the seeds cannot pass.

Again, I usually prefer to rotate the sectional roll box by peripheral contact with circular spacing blocks between the saws, and to keep the section rings, acting as the ribs of the roll box, accurately spaced while rotating by forming the rings with peripheral beads which enter and engage as roll bearings corresponding grooves in the periphery of the saw spacing blocks.

I further provide for controlling the progressive motion and thus the density of the cotton roll in the roll box by means of an adjustable seed valve at the further or discharge end of the roll box.

I also prefer to employ various other features of construction and arrangement hereafter described and illustrated in the drawings.

In order that the nature and scope of my invention may be clearly understood, I shall first describe in detail the mode in which I at present prefer to carry the invention into practice, and then point out the various features of the invention in the claims.

Reference is to be had to the accompanying drawings forming part of this specification in which like parts are designated by the same numerals in all the figures.

Figure 1:
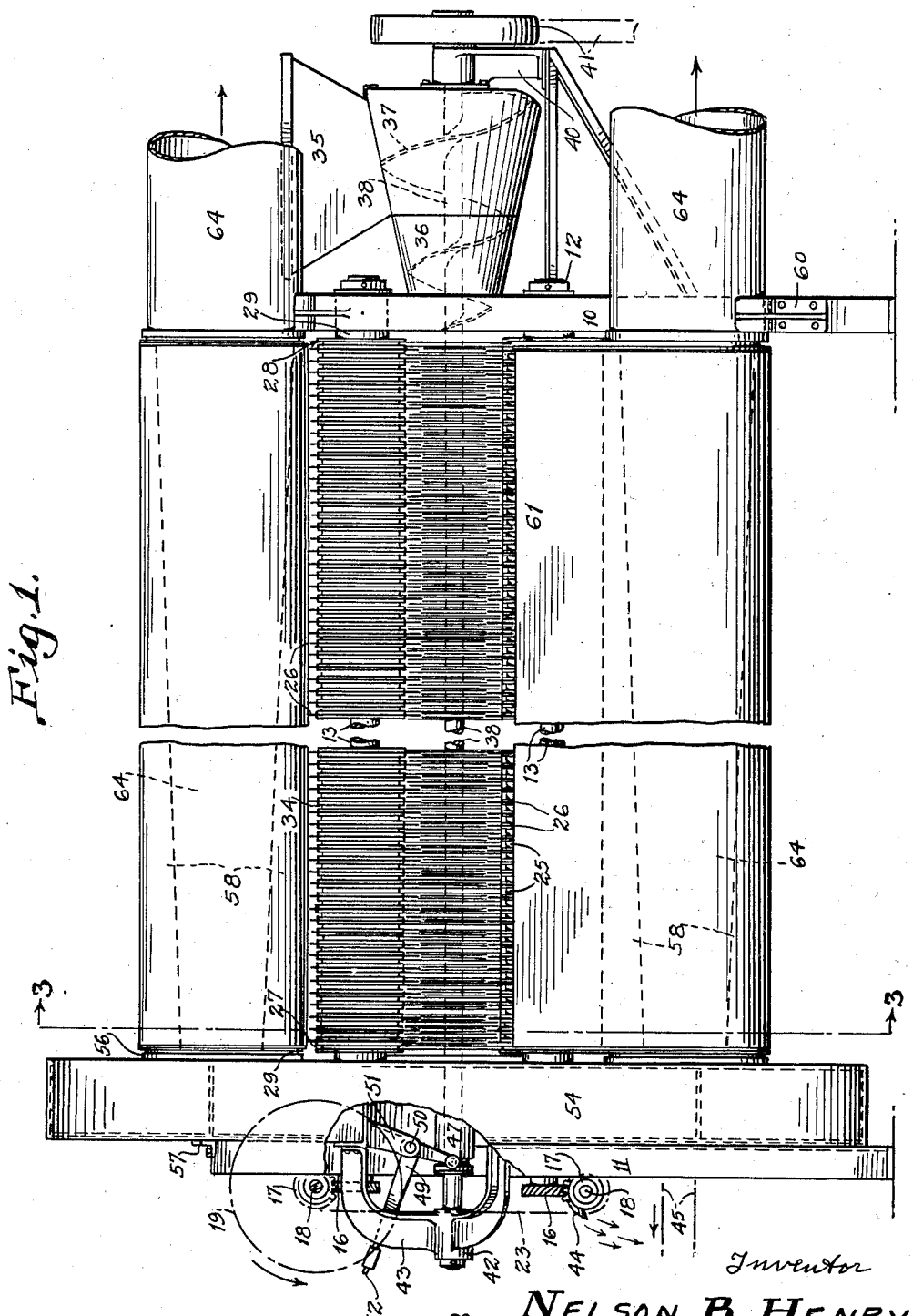
Figure 1 is a side elevation partly broken away of a fiber removing apparatus embodying my invention.
Figure 2:
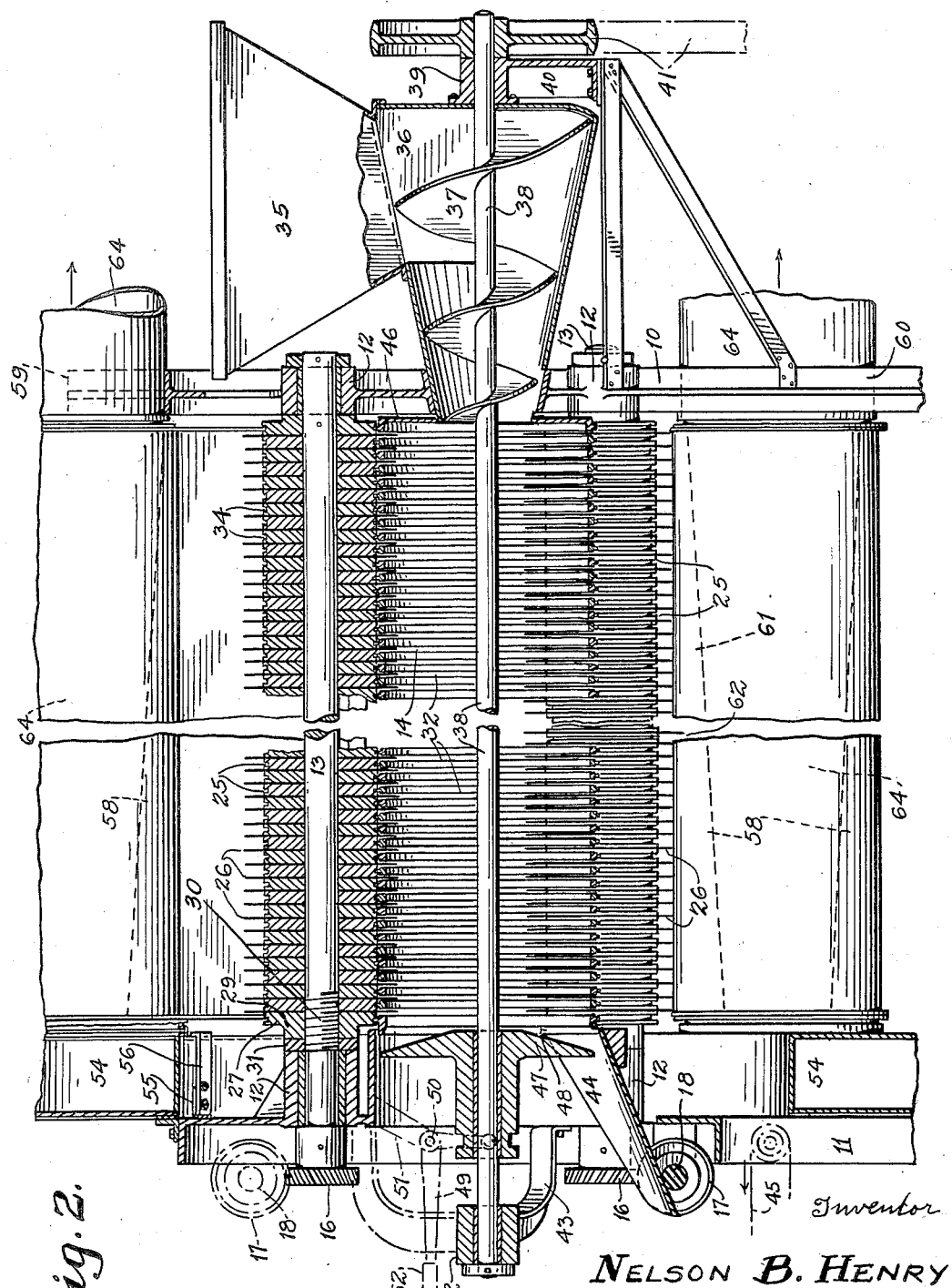
Figure 2 is a sectional elevation of the same on line 2—2, Figure 3.
Figure 3:
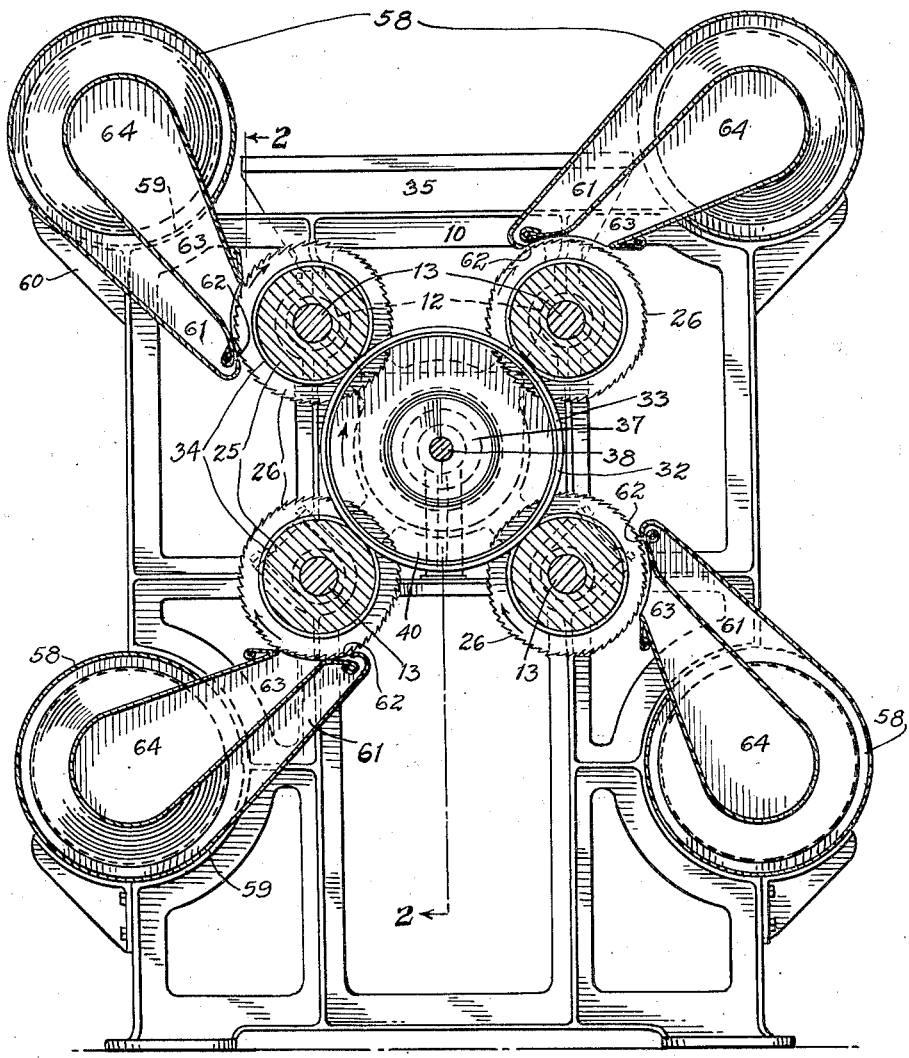
Figure 3 is a cross sectional elevation of the same on the line 3—3, Figure 1.

The frame of the apparatus in this example of my invention consists mainly of a front standard 10 and a rear standard 11, each supporting bearings 12, in which are mounted to rotate in this instance four saw cylinder shafts 13 around a roll box 14.

To rotate the saw cylinder shafts 13, I prefer to mount helical gears 16 on the rear ends of said shafts engaged by similar gears 17 on respective transverse shafts 18. The shafts 18 and thus the saw shafts 13 are rotated in unison, in this example, by a belt 20 and pulley 19 on the upper cross shaft 18, and sprocket wheels 22 and chain 23 connecting the two cross shafts 18.

I prefer to make the saw cylinders of alternate space blocks 25 and circular saws 26 slide on the shafts 13, the front and rear space blocks 28 and 27 being provided with spacing extensions 29. The rear space blocks 27 are preferably threaded on the corresponding ends 30 of shafts 13, and additionally secured thereon by lock nuts 31 after the space blocks 27 have been screwed down on the shafts 13 to tighten the alternate succession of saws and space blocks thereon.

The corresponding space blocks of each of the four saw cylinders here shown are transversely aligned, that is, in the same transverse planes. The four transverse sets of space blocks thus formed are adapted to support and roll between them a longitudinal series of rings 32 forming the spaced ribs of the sectional roll box 14, each ring or rib 32 being provided with a peripheral tongue 33 which is fitted to enter and roll in an annular groove 34 formed in each of the corresponding space blocks 25. It will be seen that the ribs or rings 32 are automatically spaced by the grooves in the space blocks 25, thus obviating any necessity for painstaking spacing and adjustment of the ribs or saws. Whenever it is desired to replace a worn out rib, it is a simple matter to remove a saw cylinder and introduce the new rib where desired.

Though I have shown the space blocks 25 as having the grooves 34 cut therein, it is evident that they may be formed in any other suitable manner. For instance, the space blocks may be formed of a circular plate and a washer of greater diameter on each side of said plate, the washer taking care of the wear to which the space blocks are subjected.

It will be seen that rotation of the saw cylinders will cause the rotation of the rings 32 constituting the roll box into which the seed cotton is fed to be ginned or delinted as the case may be.

The rotating roll box 14 is thus formed of accurately spaced ribs or rings 32, and through the spaces between the said ribs or rings extend the peripheries of the saws 26.

In order to feed seed cotton into the front end of the roll box, I, in this example of my invention, provide a hopper 35 leading to a frusto-conical box 36 in which is adapted to rotate a tapering spiral conveyor 37 on a shaft 38, the seed cotton being slightly compressed by the tapering chamber 36. Shaft 38 is journaled at one end in a bearing 39 which is supported by a bracket 40, and is rotated by any external means, such as a belt and pulley 41. The other end of shaft 38 is in this instance extended axially through the roll box and journaled in a bearing 42 supported by bracket arms 43 as shown.

As there is always a likelihood of some cotton hulls being present in the seed cotton, it is advisable to have the seed cotton on the outside of the cotton roll in the roll box. This is accomplished by the centrifugal action exerted on the cotton roll by the rotating roll box, the seeds, which have a greater specific gravity than the hulls, being forced to the outside of the cotton roll. Another force tending to separate the seed cotton from the hulls is the engagement of the saw teeth with the fiber. The teeth catch hold of the fiber and pull the seed and the fiber thereon to the outside of the roll and against the inside of the ribs or rings 32.

When the seeds are forced against the ribs, they are prevented from passing through the spaces between the ribs because of the narrowness of said spacings. The fiber is thereupon pulled from the seed by the saw teeth which carry the fiber outside the roll box by their continued rotation.

Due to the rotation of the roll box, the cotton roll is always revolving. There is therefore no likelihood of the roll ceasing to rotate and the cutting of grooves in the roll by the saws, in which grooves the saws would rotate and thus fail to exert their proper ginning action.

To prevent any loss of seed cotton because of the piling up thereof which might take place at the intake end of the roll box, I prefer to form an extension 46 on the front rib 32 to close the space around the feed box.

As the seed cotton is fed into the roll box, the cotton roll is pushed along in the rotating roll box, and thus is produced a spiral motion of the roll. In this manner each seed is acted on by a plurality of saws, and should one or two of the saws be dull, there would still be a complete removal of fiber from the seed.

Should some damp or dirty cotton be fed into the roll box and there be a slight choking of fiber between the ribs, the rotation of the ribs will carry this slight mass of choked cotton up to the next saw where it will be cleaned out. It will thus be perceived that I have provided positive means to prevent any choking between the ribs.

Further, the wear on each rib is distributed evenly over its entire surface, thus increasing tremendously the span of life of each rib.

The seeds from which the fiber has been removed, and any hulls which may be present, are ejected from the roll box at the rear end thereof, preferably by a chute 44 which discharges upon a conveyor 45 indicated in dot and dash lines.

In order to ensure a complete removal of fiber from the seed, I prefer to provide an adjustable valve 47 at the discharge end of the roll box which is adapted to coact with the beveled edge 48 of the rearmost rib 32. Said valve is here shown loosely mounted on shaft 38 and is adapted to be moved toward or away from the roll box to vary the size of the discharge opening by means of a bell crank lever 49 pivoted as at 50 to a bracket 51. In order that the lever 49 may be locked in any desired position, I provide, in this instance, an ordinary locking device 52 to engage one of the bracket arms 43 as shown, though of course, any other suitable locking means may be employed.

By thus restricting the discharge opening of the roll box, the seeds are compelled to remain in the roll box and be acted upon by the saws for a longer period of time than would ordinarily elapse in the passage of the seed through the roll box.

Though I have shown the longitudinal axis of the roll box as being horizontal, it may be placed at any angle to the horizontal. Should the roll box be placed upright, that is, with its longitudinal axis vertical, the feeding mechanism 35, 36 and 37 may be dispensed with if desired, and the seed cotton fed into the roll box by gravity or any other suitable means. In this case, the rear valve 47 is closed at the beginning of the operation of the machine until the fiber has been removed from some of the seed, when it is opened and the regular procedure described above is followed.

As there is a tendency for the fibers to be injured if presented in too great number per seed and with too great force to the saws, it is often an advantage to have an inclined roll box. In this event, the density of the cotton roll at the top of the roll box is slight and thus only loose seed cotton is presented to the saws. A little of the fiber is removed and the quantity of fiber per seed is therefore reduced and the seed can be presented with more and more force to the saws as the operation proceeds. The increasing density of the cotton roll as the seed traverses the roll box presents the seed with increasing force to the saws, and thus a greater quantity of fiber is removed from the seed with less likelihood of injury to the fiber.

In order to remove the cotton fibers from the saw teeth after they have passed through the roll box, I prefer to employ an air blast and blow the fibers from the teeth. Such air blast is, in this example of my invention, provided as follows:

Compressed air is led from a compressor (not shown) through an air duct 53 to a ring shaped distributing flue 54 which is secured to the rear standard 11 by any suitable means, such as adjustable brackets 55 and 56 mounted on said standard, and angles 57.

From the ring flue 54, the air is led into longitudinal flues 58 which are mounted to rock in segmental bearings 59, 60 on the frame of the apparatus. Said flues 58 may rest by gravity on the bearings thus provided, or they may be detachably secured thereto. The air is then led from the flues 58 through transverse ducts 61 and nozzles 62, whence it issues to the saw teeth in the form of sheets of air, since the nozzles 62 extend the entire length of the machine. The mixture of air and cotton fiber is then led through ducts 63 to frusto-conical ducts 64 preferably positioned in the interior of flues 58 concentric thereto. The ducts 64 preferably flare lengthwise as shown in order to accommodate the increasing quantity of air and fiber blown into them as they extend forward. From the ducts 64 the cotton and air mixture is led to a condenser (not shown) where the cotton fiber is removed from suspension in the air.

It will be understood that other means for removing the fiber from the saw teeth may be used without departing from the invention. For example, a separate air supply may be provided for each saw cylinder, instead of the single supply for all the saw cylinders shown in the drawings. Also, the fiber may be brushed off the teeth, or drawn off by suction.

The cotton and air ducts 64 are preferably arranged concentric with the air chambers 58 so that they may be easily rocked on their bearings 59, 60 out of the way whenever it is desired to examine or repair the saw cylinders.

In the drawings, I have shown four saw cylinders coacting with the roll box, but I do not wish to limit myself to this specific construction since the invention is equally applicable to any number of saw cylinders coacting with the roll box. For example, if five saw cylinders are to be used, they are spaced 72 degrees apart around the roll box. If only one or two saw cylinders should be employed, the roll box would be additionally supported by grooved idler rolls, substantially identical with the space blocks.

Figure 4:
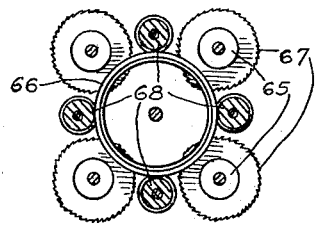
Figure 4 is a diagrammatic view illustrating a broad modification of the same.
Figure 5:
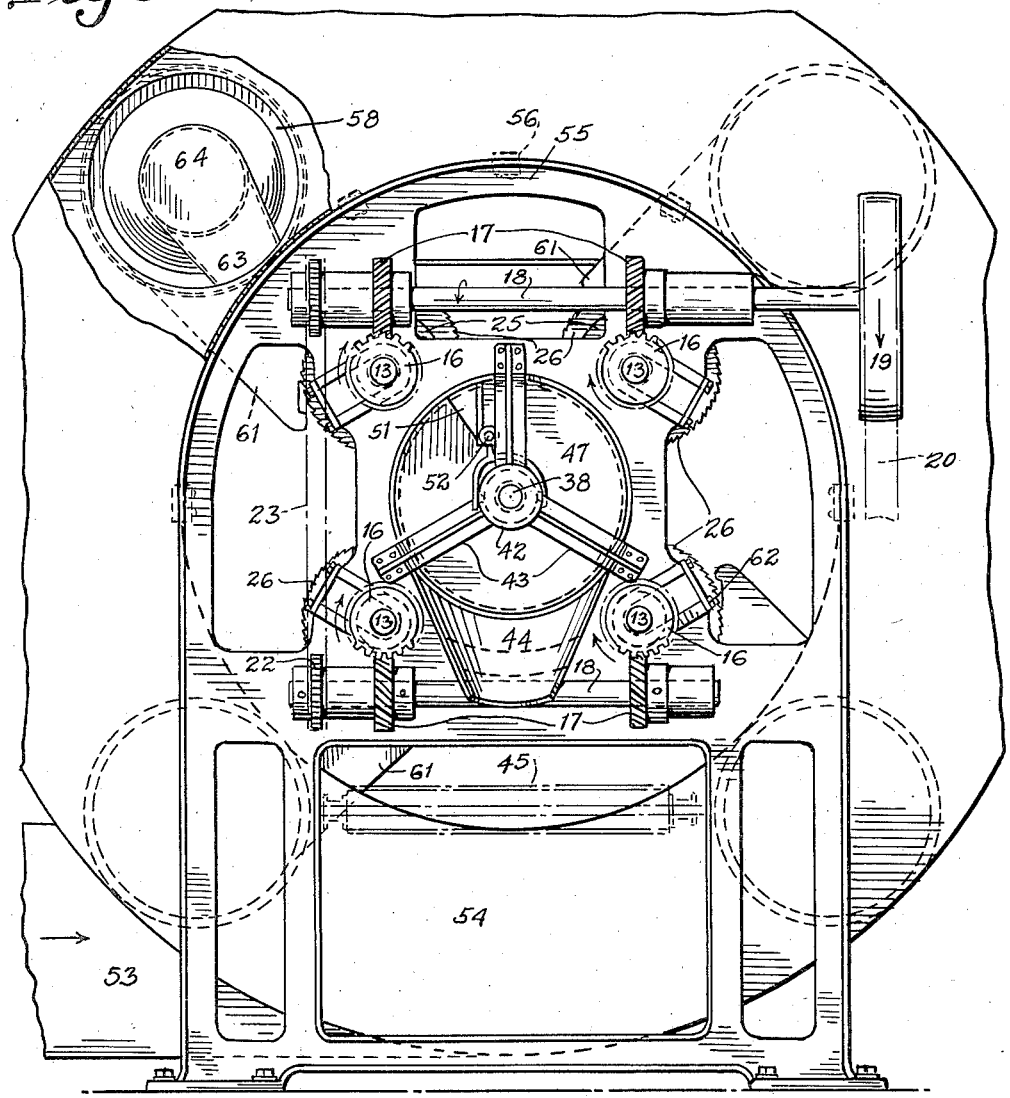
Figure 5 is a rear end elevation of the same, partly broken away.
Figure 6:
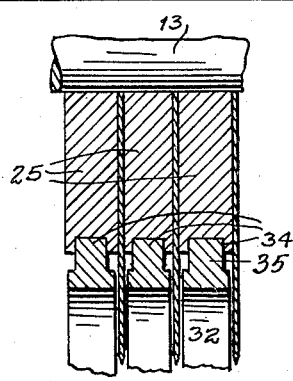
Figure 6 is an enlarged sectional view showing the arrangement of the roll box and saws.

In Figure 4 I have shown a modification of my invention, wherein the space blocks 65 on the saw cylinders are diminished in diameter until they no longer contact with the ribs or rings 66 of the roll box, though the peripheries of the saws 67 still project into the roll box. In this case, I prefer to support and rotate the roll box by means of independent grooved driving rolls 68. In case it is desired to rotate the roll box at a speed different from that of the saws and not dependent thereon, these rolls 68 are driven independently of the saw cylinder drive.

The apparatus described is equally applicable to a seed cotton and hull separator. When it is to be used for this purpose, the spacings between the revolving ribs are merely increased sufficiently to permit the passage therethrough of the seeds but not the hulls.

When the apparatus is to be used as a delinter for removing the short fibers from the seed after the seed has been ginned, the discharge opening of the roll box is restricted by the valve 47 and the seed is forced into the feeding opening in any suitable manner. For instance, the conveyor 37 may be continued throughout the entire length of the roll box and thus present the seed cotton under pressure to the saws.

It will thus be perceived that I have provided an apparatus for removing fiber from seed cotton which ensures a rotating roll box and a cotton roll revolving in the same direction; which removes a greater amount of fiber from each seed than is possible with the present gins and delinters; which always automatically cleans out the spacings between the ribs and so prevents choking of the fiber; and which provides for easily and quickly replacing ribs and saws, increases the life of each rib by increasing the wearing surface thereof, and provides for the continued discharge of the ginned seed from the cotton roll.

Instead of using four or five gins or delinters, a gin of four and five times the capacity is provided, thus affording a great saving in floor space and obviating the use of the distributing system now necessary when several gins are operated in a gin house.

I do not wish to limit myself to the specific construction and arrangement described, as it is evident that many changes may be made therein without departing from the boundaries of my invention as defined by the following claims.

I claim as my invention:

1. In an apparatus for removing fiber from seed cotton, a rotatable roll box in combination with a saw cylinder, parts thereof in rolling engagement with the roll box to effect rotation of said roll box.

2. In an apparatus for removing fiber from seed cotton, a rotatable roll box open at both intake and discharge ends, means in rolling contact with the outer periphery of said roll box for supporting and rotating said roll box, means for feeding seed cotton through said roll box during the rotation thereof, means adjustable axially of said roll box for regulating the discharge opening and thus the density of the roll, and fiber removing saws extending into the roll box.

3. In an apparatus for removing fiber from seed cotton, a roll box, a peripheral series of saw cylinders around the roll box, longitudinal air supply ducts and nozzles leading to the respective saw cylinders, an annular air duct leading to the several longitudinal air supply ducts, and fiber flues leading from the several saw cylinders axially through the air supply ducts.

4. In apparatus for removing fiber from seed cotton: a support; a shaft rotatable on said support; a saw cylinder fixed to said shaft and comprising a series of annular space blocks and saws fixed in alternation on said shaft; a roll box composed of axially alined and spaced apart annular ribs, said saws extending into the spaces between said ribs; and means for holding the peripheries of said ribs in rolling contact with said space blocks.

5. In apparatus for removing fiber from seed cotton: a support; a shaft rotatable on said support; a saw cylinder fixed to said shaft and comprising a series of annular space blocks and saws fixed in alternation on said shaft; a roll box composed of axially alined and spaced apart annular ribs, said saws extending into the spaces between said ribs; and means for holding the peripheries of said ribs in rolling contact with said space blocks, said space blocks and ribs being provided with means cooperating to hold the ribs in fixed spaced apart relationship to the saws projecting into the roll box.

6. In apparatus for removing fiber from seed cotton: a support; a shaft rotatable on said support; a saw cylinder fixed to said shaft and comprising a series of annular space blocks and saws fixed in alternation on said shaft; a roll box composed of axially alined and spaced apart annular ribs, said saws extending into the spaces between said ribs; and means for holding the peripheries of said ribs in rolling contact with said space blocks, said space blocks and ribs having their contacting peripheries connected by tongue and groove joints to hold the ribs in fixed spaced apart relationship to the saws projecting into the roll box.

7. In apparatus for removing fiber from seed cotton: a support; a shaft rotatable on said support; a saw cylinder fixed to said shaft and comprising a series of annular space blocks and saws fixed in alternation on said shaft; a roll box composed of axially alined and spaced apart annular ribs, said saws extending into the spaces between said ribs; means for holding the peripheries of said ribs in rolling contact with said space blocks, said space blocks being provided with grooves extending around their peripheries and said ribs having tongues extending around their peripheries and seated in said grooves to hold the ribs in fixed spaced apart relationship to the saws projecting into the roll box.

8. In apparatus for removing fiber from seed cotton: a support, a series of parallel shafts rotatable on said support with their axes lying in a cylinder, a roll box composed of a series of relatively movable annular ribs arranged coaxial with said cylinder, means in rolling contact with the outer peripheries of said ribs for holding said ribs spaced apart from and in axial alinement with each other, saws mounted on said shafts and extending through the spaces between said ribs into said roll box, and means for rotating said shafts and the first named means.

9. In apparatus for removing fiber from seed cotton: a support; a series of parallel shafts rotatable on said support with their axes lying in a cylinder; saw cylinders each including annular space blocks and saws fixed in alternation on said shafts; means for rotating said shafts; and a roll box composed of a series of spaced apart relatively movable annular ribs arranged coaxial with said cylinder with the said saws extending through the spaces between said ribs and into said roll box, said space blocks being in rolling contact with the outer peripheries of said ribs.

10. In apparatus for removing fiber from seed cotton: a support; a series of parallel shafts rotatable on said support with their axes lying in a cylinder; saw cylinders each including annular space blocks and saws fixed in alternation on said shafts; means for rotating said shafts; a roll box composed of a series of spaced apart relatively movable annular ribs arranged coaxial with said cylinder with the said saws extending through the spaces between said ribs and into said roll box; and means in rolling contact with said ribs for supporting and rotating the ribs of said roll box independently of said shafts.

11. In apparatus for removing fiber from seed cotton: a support; a series of parallel shafts rotatable on said support with their axes lying in a cylinder; saw cylinders each including annular space blocks and saws fixed in alternation on said shafts; means for rotating said shafts; and a roll box composed of a series of spaced apart annular ribs arranged coaxial with said cylinder with the said saws extending through the spaces between said ribs and into said roll box, said ribs and space blocks having their peripheries in rolling contact with each other to transmit the rotation of one of said shafts to the roll box as a whole.

12. In apparatus for removing fiber from seed cotton: a support; a series of parallel shafts rotatable on said support with their axes lying in a cylinder; saw cylinders each including annular space blocks and saws fixed in alternation on said shafts; means for rotating said shafts; a roll box composed of a series of spaced apart annular ribs arranged coaxial with said cylinder with the said saws extending through the spaces between said ribs and into said roll box; said ribs and space blocks having their peripheries in rolling contact with each other and connected by a tongue and groove joint to hold the ribs in fixed spaced apart relationship with each other and to transmit the rotation of any of said shafts to the roll box as a whole.

13. In apparatus for removing fiber from seed cotton: a support, a roll box composed of a series of similar annular ribs; means rotatable on said support and in rolling contact with the outer peripheries of said ribs for holding said ribs rotatable synchronously and spaced apart along a common axis, a saw cylinder rotatable on said support and having the saws thereof extending through the spaces between said ribs into said roll box; and means rotating said saw cylinder and said rotatable means.

14. In apparatus for removing fiber from seed cotton: a support; a roll box composed of a series of similar annular ribs; means on said support for holding said ribs rotatable synchronously and spaced apart along a common axis, a saw cylinder rotatable on said support and having the saws thereof extending through the spaces between said ribs into said roll box; and means rotating said saw cylinder, said saw cylinder having parts thereof in rolling contact with said ribs to transmit rotation to the roll box as a whole.

15. In apparatus for removing fiber from seed cotton: a support; a roll box rotatable on said support and comprising a series of similar annular ribs; and means rotatable on said support and in rolling contact with the outer peripheries of said ribs for holding said ribs in spaced apart relationship along a common axis and for rotating said ribs in unison.

NELSON B. HENRY.